United States Patent
Suga

(10) Patent No.: US 6,443,049 B2
(45) Date of Patent: Sep. 3, 2002

(54) HYDRAULIC PISTON

(75) Inventor: Toshitaka Suga, Nagoya (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 0 days.

(21) Appl. No.: 09/799,115

(22) Filed: Mar. 6, 2001

(30) Foreign Application Priority Data

Mar. 28, 2000 (JP) ........................................ 2000-089397

(51) Int. Cl.$^7$ .................................................. F16J 9/00
(52) U.S. Cl. ........................................................ 92/248
(58) Field of Search ........................ 92/248, 249, 254; 74/72.4

(56) References Cited

U.S. PATENT DOCUMENTS

| | | | | |
|---|---|---|---|---|
| 3,984,904 A | * | 10/1976 | Schlecht | .................. 92/248 X |
| 5,484,041 A | * | 1/1996 | Cadaret et al. | .......... 188/73.37 |
| 5,713,435 A | * | 2/1998 | Schneider et al. | ......... 188/71.6 |
| 5,826,686 A | * | 10/1998 | Rike | ....................... 92/248 X |
| 5,845,747 A | * | 12/1998 | Rike et al. | ................. 188/72.4 |

FOREIGN PATENT DOCUMENTS

| | | | | |
|---|---|---|---|---|
| FR | 1462580 | * | 12/1965 | .................. 92/248 |
| JP | 18857 A | * | 1/1982 | .................. 92/248 |
| JP | 0062773 A | * | 4/1984 | .................. 92/248 |
| JP | 62-137435 | | 6/1987 | |
| SU | 0815379 | * | 3/1981 | .................. 92/248 |

* cited by examiner

Primary Examiner—John E. Ryznic
(74) Attorney, Agent, or Firm—Burns, Doane, Swecker & Mathis, LLP

(57) ABSTRACT

A hydraulic piston for a disc brake assembly includes a metallic cylinder with a bottom at one end and a hollow resin cylinder with an opening at each end. The hollow resin cylinder is disposed in an inner surface of the metallic cylinder and closes the opening at one end of the hollow resin cylinder. The hollow resin cylinder further includes a main part disposed in the inner surface of the metallic cylinder and a flange portion having an outer diameter which is wider than the outer diameter of the main part of the hollow resin cylinder. The flange portion is formed on the main part at the other end of the hollow resin cylinder, integrally or with a separate member. An annular groove is defined between the flange portion and an open end of the metallic cylinder.

22 Claims, 3 Drawing Sheets

HYDRAULIC PISTON

This application is based on and claims priority under 35 U.S.C. §119 with respect to Japanese Application No. 2000-089397 filed on Mar. 28, 2000, the entire content of which is incorporated herein by reference.

BACKGROUND OF THE INVENTION

The present invention relates to a hydraulic piston, and more particularly to a hydraulic piston made of a resin (hereinafter 'resin hydraulic piston') for a disc brake assembly which is mainly utilized as a wheel brake system of an automobile.

As one of the prior arts related to the present invention, a resin hydraulic piston is disclosed in Japanese Patent Laid-Open Publication 62(1987)-137435.

The above prior art resin hydraulic piston provides the following two advantages: a light-weight structure and a high heat resistance.

Following recent conservation efforts of saving natural resources, minimizing fuel usage, and environmental conservation and so on, components used for an automobile have been required to minimized weight. Since resin is light-weight, the prior art resin hydraulic piston is favorable viewed as a hydraulic piston for a disc brake assembly. Taking a resin hydraulic piston which is filled with glass fibers as an example, tensile strength of the resin hydraulic piston approximately reaches the tensile strength of an aluminum casting-alloy. In addition, the weight of the piston is almost two-third that of an aluminum alloy, which indicates a light-weight structure.

Generally speaking, the frictional heating caused by the frictional engagement between a disc brake pad and a disc rotor is transferred to a brake fluid through a hydraulic piston made of metal (hereinafter 'metallic hydraulic piston'). On the contrary, if the hydraulic piston is made of resin, the high heat resistance of the resin hydraulic piston minimizes the frictional heating transferred to the brake fluid. Therefore, a disc brake provided with the resin hydraulic piston does not cause a vapor lock phenomenon as often as a metallic hydraulic piston does.

However, the hardness of the resin hydraulic piston proves is a disadvantage. Since the resin hydraulic piston is substantially less hard than the metallic hydraulic piston, an outer periphery of the resin hydraulic piston may be easily flawed when the resin hydraulic piston slidably moves in a cylinder bore. In addition, when the resin hydraulic piston is pulled from the cylinder bore at a high air pressure and replaced with a new piston, the resin hydraulic piston sometimes may be cracked due to contact with the cylinder. Flaws on the outer periphery of the resin hydraulic piston may cause the brake fluid to leak, which leads to functional brake defects. Cracks in the resin hydraulic piston also may raise the maintenance cost of the piston.

SUMMARY OF THE INVENTION

To overcome the above drawbacks in hardness, which the prior art of the conventional resin hydraulic piston may cause, it is necessary for the prior art hydraulic piston to be formed by a resin cylinder and a metallic cylinder. The present invention prevents flaws and cracks in the resin hydraulic piston and provides a light-weight disc brake having a high reliability.

Accordingly, it is an object of the present invention to provide an improved hydraulic piston which prevents flaws and cracks in the hydraulic piston and provides a light-weight disc brake assembly having a high reliability.

It is a further object of the present invention to minimize the manufacturing cost of the hydraulic piston.

It is yet another object of the present invention to provide various design choices for the hydraulic piston.

According to the present invention, the hydraulic piston includes a metallic cylinder with a bottom at one end and a hollow resin cylinder with an opening at each end disposed in an inner surface of the metallic cylinder. The opening at one end of the hollow resin cylinder is closed by the bottom of the metallic cylinder. According to this structure of the present invention, a main part of the hydraulic piston is formed by the hollow resin cylinder. An outer periphery of the hydraulic piston is coated with metal.

The effects in this invention of the hydraulic piston are as follows: The metal coating causes very few flaws and cracks in the hydraulic piston when the hydraulic piston slidably moves in a cylinder bore. In addition, the present invention takes advantage of a light-weight structure of the hollow resin cylinder.

According to another aspect of the present invention, the hollow resin cylinder includes a main part disposed in the inner surface of the metallic cylinder and a flange portion formed on the main part at the other end of the hollow resin cylinder. An outer diameter of the flange portion is wider than the outer diameter of the main part. An open end of the metallic cylinder is disposed by an outer periphery of the main part of the hollow resin cylinder.

The effects in this structure of the hydraulic piston mentioned above are as follows: An annular groove is defined between the flange portion and the open end of the metallic cylinder. A hermetic seal can be disposed in the annular groove. This structure dispenses with the process to form a seal groove to be disposed with the hermetic seal therein. Therefore, this structure defining the annular groove between the flange portion and the open end of the metallic cylinder is effective to minimize manufacturing costs of the hydraulic piston.

The present invention suggests two choices to form the flange portion, which indicates advantages of the present invention: forming the flange portion integrally with the main part of the hydraulic cylinder and forming the flange portion by a separate member from the main part of the hydraulic cylinder.

According to a further aspect of the present invention, the flange portion is formed integrally with the main part of the hollow resin cylinder. The effect in this structure is as follows: This structure does not require complicated mold shapes and machining processes after forming. Therefore, this structure is effective to minimize the manufacturing costs of the hydraulic piston.

A still further aspect of the present invention is that the flange portion is formed by a separate hollow member which is separate from the main part of the hollow resin cylinder. The flange portion is formed by disposing a ring-shaped cylinder onto the main part at the other end of the hollow resin cylinder where the outer diameter of the main part is uniform. The effect in this structure is as follows: According to the ring-shaped cylinder disposed onto the main part at the other end of the hollow resin cylinder, the flange portion and the main part can be formed from a simple hollow cylindrical material. Therefore, this structure does not necessarily require any mold to form the flange portion.

When the production number of the cylinder is small, the ring-shaped cylinder may be made from a cut resin pipe, which leads to further reduction in cost. In other words, material for the flange portion does not always have to be the same as that for the main part of the hollow resin cylinder. Therefore, this structure allows various design choices for the hydraulic piston.

According to another aspect of the present invention, a disc portion made of resin (hereinafter 'resin disc portion') is disposed between the opening at the one end of the hollow resin cylinder and the bottom of the metallic cylinder at the inner surface. The effects in this structure are as follows: This structure improves the strength of the bottom portion of the hydraulic cylinder to which brake pressure is to be applied. Further, as far as the variety in thickness of the resin disc portion and the hollow resin cylinder, the hydraulic piston is able to be applied for any specification from low pressure use to high pressure use. Therefore, this structure allows various design choices.

This present invention suggests two choices to shape the bottom of the metallic cylinder, which indicates advantages of this present invention: a concave shape and a convex shape.

According to a further aspect of the present invention, the bottom of the metallic cylinder is of a concave shape which bend inwardly towards an inner surface of the hollow resin cylinder. In other words, the bottom of the metallic cylinder is of a concave shape which projects inwardly from an outside of the hydraulic piston. The effect in this structure is as follows: This concave structure serves as a part of hydraulic pressure chamber defined by the hydraulic piston and the cylinder bore and assures the volume of the hydraulic pressure chamber.

A still further aspect of the present invention includes the structure that the bottom of the metallic cylinder is of a convex shape which projects away from the inner surface of the hollow resin cylinder. In other words, the bottom of the metallic cylinder is of a convex shape which projects outwardly from an inside of the hydraulic piston. Compression stress is generated at the bottom of the metallic cylinder when the brake hydraulic pressure is applied thereto. Therefore, this structure greatly improves the hydraulic piston in strength.

Thus the present invention has the following advantages: upon the hydraulic piston being slidably moved in the cylinder bore, the hydraulic piston formed by the hollow resin cylinder with an opening at each end and the metallic cylinder with a bottom at one end prevents flaws and cracks in the hydraulic piston. Thus, this present invention improves the hydraulic piston in strength, weight and cost with a high reliability. In addition, this present invention allows various design choices.

BRIEF DESCRIPTION OF THE DRAWINGS

A more complete appreciation of the invention and other advantages thereof will be readily obtained as the same becomes better understood by reference to the following detailed description when considered in connection with the accompanying drawings, in which.

DESCRIPTION OF THE PREFERRED EMBODIMENTS

Figure 1:
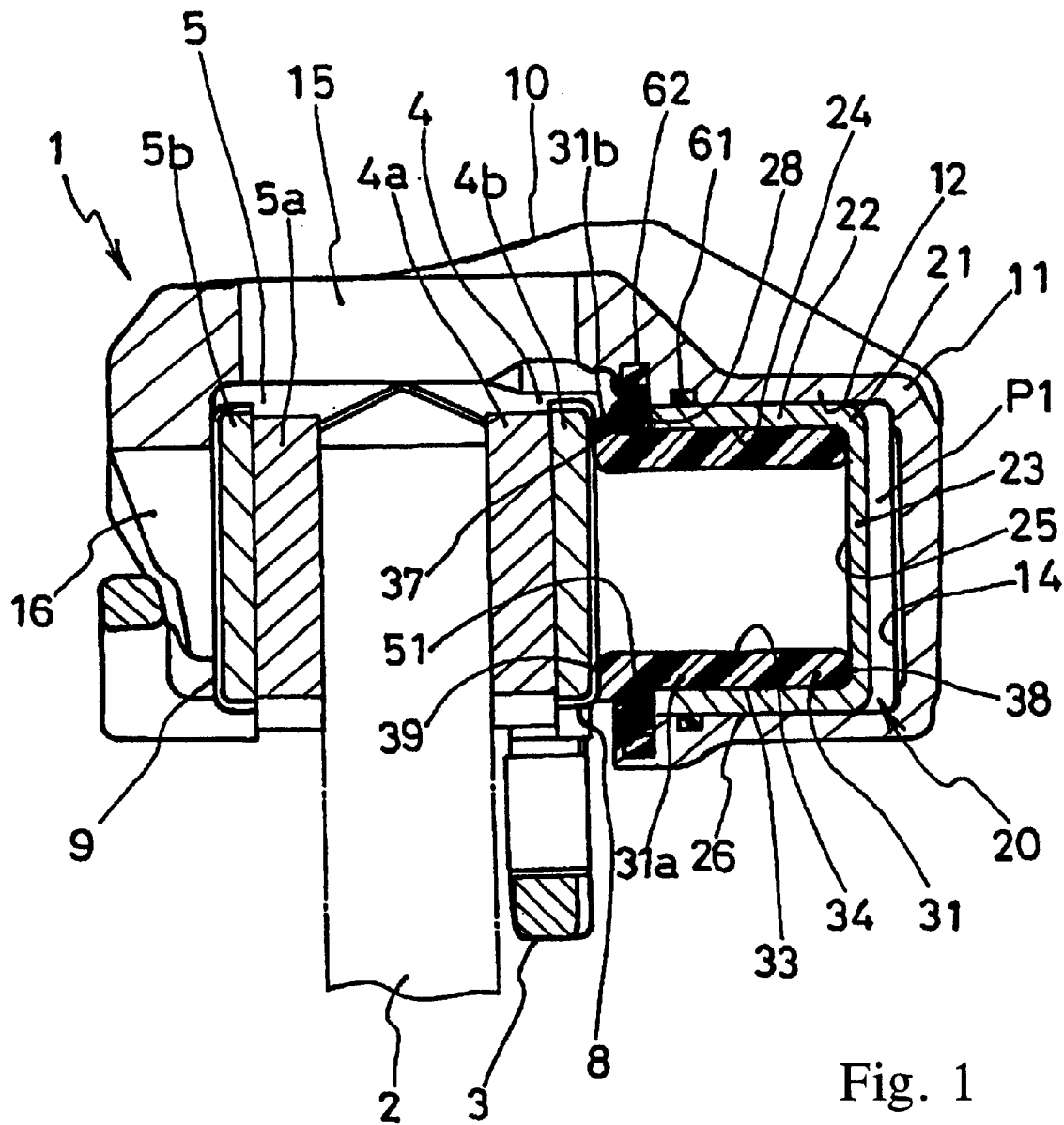
FIG. 1 shows a cross sectional view, illustrating an outline of a disc brake assembly utilizing a hydraulic piston according to a first embodiment of the invention.

The preferred embodiments of a hydraulic piston formed by a resin cylinder made of resin (hereinafter after 'resin cylinder') and a metallic cylinder of the present invention are described as follows referring to FIGS. 1 through 5 in the attached drawings. FIG. 1 shows a cross sectional view of an outline of a disc brake assembly utilizing the hydraulic piston formed by the resin cylinder and the metallic cylinder of the first embodiment of the present invention. The principal components of this disc brake assembly are pads, a disc rotor, mount, caliper, and the hydraulic piston. The disc rotor 2 is rotated as one unit with a wheel of a vehicle (not shown). An inner pad 4 and an outer pad 5 are disposed on each side of the disc rotor 2. The mount 3 is fixed to the non-rotating part of the vehicle with bolts (not shown). The mount 3 is disposed on one side (inner side) of the disc rotor 2. The mount 3 directly receives a brake torque which is applied to the inner pad 4 and the outer pad 5. The caliper 10, supported by the mount 3, is slidably movable in an axial direction of the disc rotor 2. The pads 4 and 5 respectively have pad linings 4a and 5a connected with pad back plates 4b and 5b.

A cylinder bore 12 is disposed in a cylinder portion 11 which is provided in the caliper 10. The hydraulic piston 20 is disposed in the cylinder bore 12 via a liquid seal 61 and a hermetic seal 62. A hydraulic pressure chamber P1 is defined by the cylinder bore 12, the hydraulic piston 20 and the liquid seal 61. When the brake is applied, a brake fluid is transferred by a master cylinder (not shown) into the hydraulic pressure chamber P1 through a brake conduit (not shown) which is hydraulically connected to the hydraulic pressure chamber P1.

When the pressurized brake fluid is transferred into the hydraulic pressure chamber P1, the hydraulic piston 20 is moved outwardly (to the left side in FIG. 1) by the hydraulic pressure which is generated corresponding to the area of a bottom portion 23 of the hydraulic piston 20. Therefore, the inner pad 4 is pressed onto the disc rotor 2.

The cylinder portion 11 is pressed inwardly (to the right side in FIG. 1) by the hydraulic pressure which is generated corresponding to the area of a bottom portion 14 of the cylinder portion 11. Since the caliper 10 is slidably movably supported by the mount 3 in the axial direction of the disc rotor 2, the caliper 10 pressed by the hydraulic pressure is moved inwardly (to the right side in FIG. 1). Therefore, an edge portion 16, which is provided on the caliper 10 at the opposite side of the cylinder portion 11, is pressed onto the disc rotor 2.

In other words, the hydraulic piston 20 and the caliper 10 are pressed in the opposite directions when brake pressure is generated in the hydraulic pressure chamber Pl. Therefore, the inner pad 4 and outer pad 5 are pressed onto both sides of disc rotor 2 by the hydraulic piston 20 and the edge portion 16 of the caliper 10 thereby generating brake torque. When the rotation of the disc rotor 2 is stopped by these two pads, the wheel of the vehicle is stopped by the brake torque.

Next the structure of the first embodiment of the hydraulic piston formed by the resin cylinder and the metallic cylinder will be explained by referring to FIG. 1.

The hydraulic piston 20 includes a metallic cylinder 21 having a bottom at one end and a hollow resin cylinder 31 having an opening at each end. The hollow resin cylinder 31 is disposed in an inner surface 24 of the metallic cylinder 21.

The hollow resin cylinder 31 includes a flange portion 31b. The hollow resin cylinder 31 may be assembled with the metallic cylinder 21 by press-fit, bonding or welding. Further, clearance between the inner surface 24 of the metallic cylinder 21 and an outer surface 33 of the hollow resin cylinder 31 is acceptable since the function of the disc brake 1 can still be maintained.

A seal groove (annular groove) 51 is defined between a) an open end 28 of the metallic cylinder 21 and b) one side portion 37 of the flange portion 31b which is formed integrally with the hollow resin cylinder 31. The hermetic seal 62 can be disposed in the seal groove 51 to prevent mud splash, dust and so on from entering into the clearance between the cylinder bore 12 and an outer periphery 26 of the hydraulic piston 20.

Figure 2:
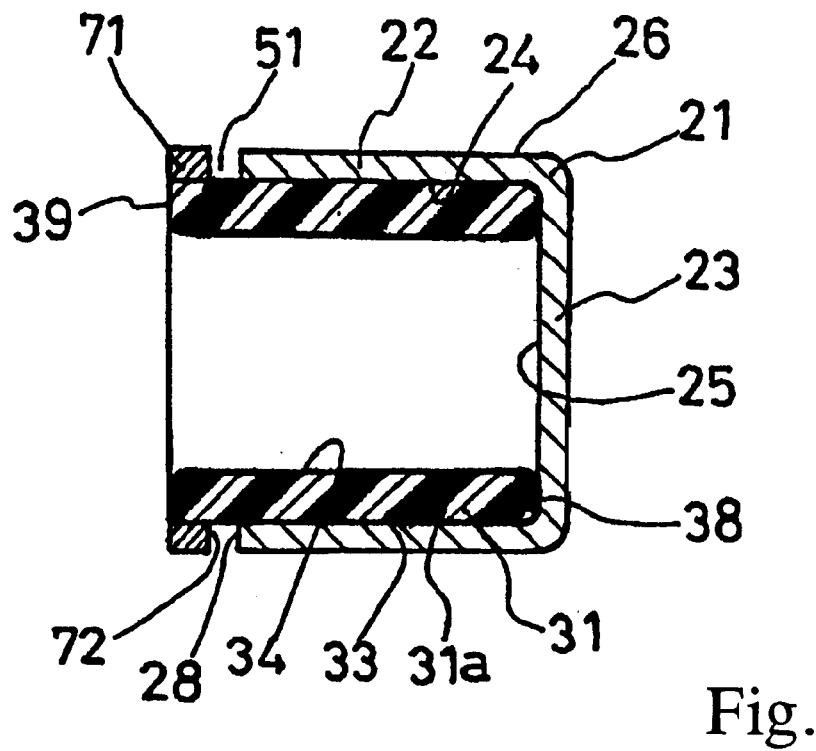
FIG. 2 shows a cross sectional view of a hydraulic piston according to a second embodiment of the invention.

FIG. 2 shows a cross sectional view of the hydraulic piston of the second embodiment of the present invention. The hydraulic piston includes the metallic cylinder 21 and the hollow resin cylinder 31 which is disposed in the inner surface 24 of the metallic cylinder 21. A flange portion is formed by providing a separate hollow member 71 on the hollow resin cylinder 31 which is instead of the integral flange portion 31b of the previous embodiment shown in FIG. 1. The flange portion 71 is fixed to the hollow resin cylinder 31 by press-fit, bonding or welding. The flange portion 71 may be made from the same material as the hollow resin cylinder 31 or from a different material.

The hollow resin cylinder 31 may be assembled with the metallic cylinder 21 by press-fit, bonding or welding. Further, clearance between the inner surface 24 of the metallic cylinder 21 and the outer surface 33 of the hollow resin cylinder 31 is acceptable since the function of the disc brake 1 can still be maintained.

Figure 3:
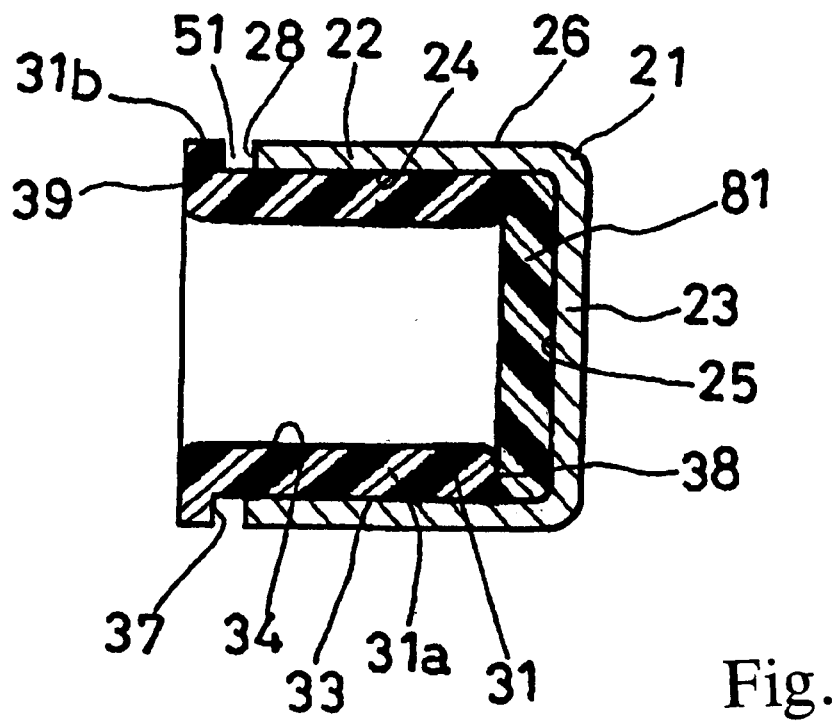
FIG. 3 shows a cross sectional view of a hydraulic piston according to a third embodiment of the invention.

FIG. 3 shows a cross sectional view of the hydraulic piston of the third embodiment of the present invention. The hydraulic piston includes the metallic cylinder 21 and the hollow resin cylinder 31 which is disposed in the inner surface 24 of the metallic cylinder 21. A resin disc portion 81 is disposed between an open end 38 of the hollow resin cylinder 31 and a bottom portion 25 at the inner surface 24 of the metallic cylinder 21. The hydraulic piston 20 of this embodiment includes the metallic cylinder 21, the hollow resin cylinder 31 and the resin disc portion 81.

The hollow resin cylinder 31 may be assembled with the metallic cylinder 21 by press-fit, bonding or welding. Further, clearance between the inner surface 24 of the metallic cylinder 21 and the outer surface 33 of the hollow resin cylinder 31 is acceptable since the function of the disc brake 1 can still be maintained. Furthermore, while the flange is shown in FIG. 3 as integrally formed, it may be separately formed.

Figure 4:
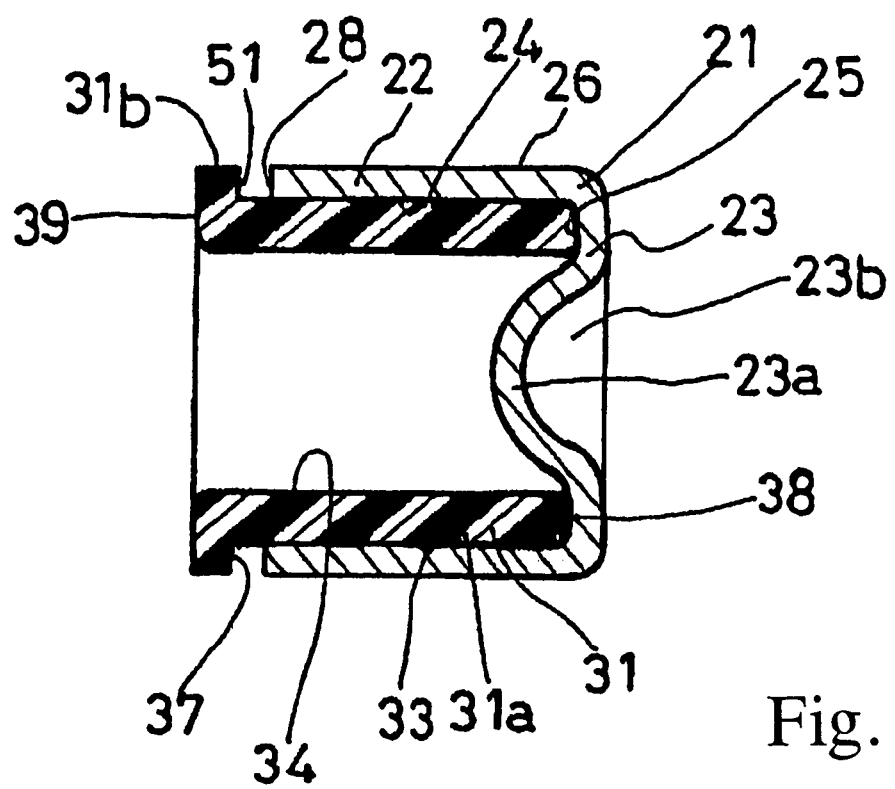
FIG. 4 shows a cross sectional view of a hydraulic piston according to a fourth embodiment of the invention.

FIG. 4 shows a cross sectional view of the hydraulic piston of the fourth embodiment of the invention. The hydraulic piston includes the metallic cylinder 21 and the hollow resin cylinder 31 which is disposed in the inner surface 24 of the metallic cylinder 21. A bottom portion 23a of the metallic cylinder 21 is of a concave shape which is concave towards the inner surface 34 of the hollow resin cylinder 31. This concave portion 23b serves as a part of hydraulic pressure chamber P1 to assure the volume of the chamber P1. While the flange 31b is shown in FIG. 4 as integrally formed, it may be separately formed.

Figure 5:
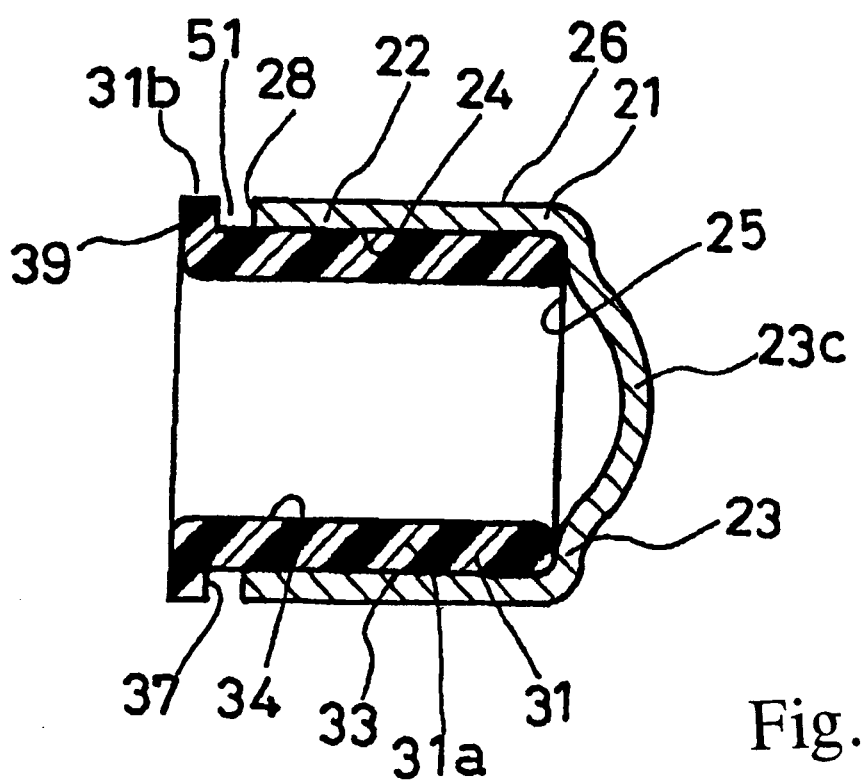
FIG. 5 shows a cross sectional view of a hydraulic piston according to a fifth embodiment of the invention.

FIG. 5 shows a cross sectional view of the hydraulic piston of the fifth embodiment of the invention. The hydraulic piston includes the metallic cylinder 21 and the hollow resin cylinder 31 which is disposed in the inner surface 24 of the metallic cylinder 21. A bottom portion 23c of the metallic cylinder 21 is of a convex shape which projects towards an outside of the hydraulic piston 20. Although this makes the entire length of the hydraulic piston 20 longer, it makes the hydraulic piston 20 stronger against compression stress which is generated at the bottom portion 23c when brake hydraulic pressure is applied onto the bottom portion 23c. Furthermore, although the flange is shown in FIG. 5 as integrally formed, it may be formed separately.

Having now fully described the invention, it will be apparent to one of ordinary skill in the art that many changes and modifications can be made without departing from the spirit or scope of the invention as set forth herein.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic piston comprising:
   a metallic cylinder having a bottom at one end; and
   a hollow resin cylinder having an opening at each end,
   wherein the hollow resin cylinder is disposed in an inner surface of the metallic cylinder such that the bottom of the metallic cylinder closes the opening at one end of the hollow resin cylinder, the hollow resin cylinder including a main part which is disposed in the inner surface of the metallic cylinder and a flange portion which is formed on the main part at the other end of the hollow resin cylinder, an outer diameter of the flange portion being wider than an outer diameter of the main part, and wherein an annular groove is defined between the flange portion and an open end of the metallic cylinder.

2. A hydraulic piston according to claim 1, wherein the flange portion is formed integrally with the main part of the hollow resin cylinder.

3. A hydraulic piston according to claim 2, further comprising:
   a resin disc portion disposed between the opening at the one end of the hollow resin cylinder and the bottom of the metallic cylinder at the inner surface.

4. A hydraulic piston according to claim 2, wherein the bottom of the metallic cylinder is of a concave shape which is concave towards an inner surface of the hollow resin cylinder.

5. A hydraulic piston according to claim 2, wherein the bottom of the metallic cylinder is of a convex shape which projects outward from an inner surface of the hollow resin cylinder.

6. A hydraulic piston according to claim 1, wherein the flange portion is formed by a separate hollow member from the main part of the hollow resin cylinder.

7. A hydraulic piston according to claim 6, wherein the separate hollow member is a ring-shaped member.

8. A hydraulic piston according to claim 1, further comprising:
   a resin disc portion disposed between the opening at the one end of the hollow resin cylinder and the bottom of the metallic cylinder at the inner surface.

9. A hydraulic piston according to claim 1, wherein the bottom of the metallic cylinder is of a concave shape which is concave towards an inner surface of the hollow resin cylinder.

10. A hydraulic piston according to claim 1, wherein the bottom of the metallic cylinder is of a convex shape which projects outward from an inner surface of the hollow resin cylinder.

11. A hydraulic piston according to claim 1, further comprising a seal provided in the annular groove.

12. A hydraulic piston comprising:

a metallic cylinder having a bottom at one end; and a hollow resin cylinder having an opening at each end, wherein the hollow resin cylinder is disposed in an inner surface of the metallic cylinder such that the bottom of the metallic cylinder closes the opening at one end of the hollow resin cylinder, the bottom of the metallic cylinder is of a concave shape which is concave towards an inner surface of the hollow resin cylinder.

13. A hydraulic piston comprising:

a metallic cylinder having a bottom at one end; and a hollow resin cylinder having an opening at each end, wherein the hollow resin cylinder is disposed in an inner surface of the metallic cylinder such that the bottom of the metallic cylinder closes the opening at one end of the hollow resin cylinder, the bottom of the metallic cylinder having a convex shape which projects outward from an inner surface of the hollow resin cylinder.

14. A hydraulic piston comprising:

a metallic cylinder having a bottom at one end; and a hollow resin cylinder having an opening at each end, wherein the hollow resin cylinder is disposed in an inner surface of the metallic cylinder such that the bottom of the metallic cylinder closes the opening at one end of the hollow resin cylinder and the other end of the hollow resin cylinder projects outside the other end of the metallic cylinder.

15. A disk brake assembly comprising:

a hydraulic piston which includes a metallic cylinder having a bottom at one end, and a hollow resin cylinder having an opening at each end, wherein the hollow resin cylinder is disposed in an inner surface of the metallic cylinder which closes the opening at one end of the hollow resin cylinder.

16. A disc brake assembly according to claim 15, wherein the hollow resin cylinder includes a main part which is disposed in the inner surface of the metallic cylinder and a flange portion which is formed on the main part at the other end of the hollow resin cylinder, an outer diameter of the flange portion being wider than an outer diameter of the main part, and wherein an annular groove is defined between the flange portion and an open end of the metallic cylinder.

17. A disc brake assemble according to claim 16, wherein the flange portion is formed integrally with the main part of the hollow resin cylinder.

18. A disc brake assembly according to claim 16, wherein the flange portion is formed by a separate hollow member from the main part of the hollow resin cylinder.

19. A disc brake assembly according to claim 17, further comprising:

a resin disc portion disposed between the opening at the one end of the hollow resin cylinder and the bottom of the metallic cylinder at the inner surface.

20. A disc brake assembly according to claim 15, wherein the bottom of the metallic cylinder is of a concave shape which is concave towards an inner surface of the hollow resin cylinder.

21. A disc brake assembly according to claim 15, wherein the bottom of the metallic cylinder is of a convex shape which projects outward from an inner surface of the hollow resin cylinder.

22. A disc brake assembly according to claim 15, wherein the other end of the hollow resin cylinder projects outside the other end of the metallic cylinder.

* * * * *